(12) United States Patent
Flaherty et al.

(10) Patent No.: US 8,637,107 B2
(45) Date of Patent: Jan. 28, 2014

(54) ANTI-BOIL-OVER COMPOSITIONS AND METHODS FOR MICROWAVE OVEN COOKING OF DRY PASTA

(75) Inventors: Jaime Davis Flaherty, Grayslake, IL (US); Yeong-Ching Albert Hong, Kildeer, IL (US); Tia Michelle Rains, Wilmette, IL (US); Cecily Elizabeth Brose, Palatine, IL (US); Ricardo Villota, Lake Zurich, IL (US); Cathy Jean Ludwig, Grayslake, IL (US); Anilkumar Ganapati Gaonkar, Buffalo Grove, IL (US); Dennis Ann Kim, Buffalo Grove, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 1516 days.

(21) Appl. No.: 11/001,845

(22) Filed: Dec. 2, 2004

(65) Prior Publication Data
US 2006/0121168 A1 Jun. 8, 2006

(51) Int. Cl.
*A23L 1/16* (2006.01)
(52) U.S. Cl.
USPC ............ 426/557; 426/451; 426/112; 426/113

(58) Field of Classification Search
USPC .................................. 426/557, 451, 112, 113
See application file for complete search history.

(56) References Cited

U.S. PATENT DOCUMENTS

| | | | |
|---|---|---|---|
| 4,229,488 A | 10/1980 | Suggs et al. | |
| 5,650,188 A * | 7/1997 | Gaubert et al. | 426/549 |
| 6,017,388 A | 1/2000 | Yuan | |
| 6,217,918 B1 | 4/2001 | Oh et al. | |
| 6,514,547 B1 | 2/2003 | Hefnawy | |
| 6,929,814 B2 * | 8/2005 | Bouwmeesters et al. | 426/575 |

FOREIGN PATENT DOCUMENTS

| | | |
|---|---|---|
| EP | 0 954 981 | 1/2004 |
| EP | 0 954 985 | 2/2004 |

* cited by examiner

*Primary Examiner* — Lien T Tran
(74) *Attorney, Agent, or Firm* — Fitch, Even, Tabin & Flannery LLP

(57) ABSTRACT

Anti-boil-over compositions and methods are provided that significantly reduce boil-over during microwave oven cooking of pasta relative similar pasta and water mixtures such that oversized containers are not required. Thus, when prepared using limited volume container, the container of cooked pasta appears full.

24 Claims, No Drawings

US 8,637,107 B2

ANTI-BOIL-OVER COMPOSITIONS AND METHODS FOR MICROWAVE OVEN COOKING OF DRY PASTA

FIELD OF THE INVENTION

Anti-boil-over compositions and methods are provided that significantly reduce boil-over in limited volume containers during microwave oven cooking of pasta (as well as other cooking techniques) relative to similar pasta and water mixtures. The present invention provides anti-boil-over compositions and methods for cooking pasta that significantly reduce and/or prevent boil-over during cooking without using an oversized container. Thus, when prepared in limited volume containers, the container of cooked pasta appears full. The methods and compositions of this invention are especially adapted for, but are not limited to, microwave cooking techniques.

BACKGROUND

Convenience foods typically require a minimum amount of consumer preparation and, thus, are in high demand to accommodate today's busy lifestyles. Microwave ovens are often used to heat or thaw convenience foods to an edible condition. Microwave ovens have also been used for cooking. However, with regard to pasta dishes, microwave ovens have typically been limited to the thawing of frozen pasta and/or the heating of pre-cooked, acidified, frozen, or chilled pasta dishes because of problems associated with pasta boil-over in the microwave oven during cooking.

In general, when noodles are cooked on the stove top, boil-over can be easily be prevented or controlled by adjusting the heating power and/or monitoring the boiling conditions. However, when microwave ovens are used for such cooking, the heating power cannot be easily controlled by monitoring and/or manipulating cooking conditions. Accordingly, cooking pasta using a microwave oven often results in boil-over and associated problems.

A traditional solution to the problem of boil-over during stove top cooking of pasta is constant and/or frequent stirring along with control of heating conditions. However, the nature of microwave cooking does not make such stirring or control of heating conditions viable solutions. Frequent stirring would also significantly reduce consumer convenience normally associated with microwave cooking (i.e., cooking with minimal consumer effort and/or intervention).

Another means to prevent boil-over during stove top cooking of pasta, is the use of an oversized container (i.e., allowing significant amount of space above the surface of the water) to allow for high boiling within the container. Typically, boil-over can be prevented by cooking pasta in a container more than three times the volume of the uncooked pasta/water mixture. However, packaging convenience foods in oversized containers is disadvantageous because the large containers appears to be only partially full (generally on the order of about a third full) after it is fully cooked which may lead to dissatisfied consumers who may think the product is not fully cooked or may feel cheated because they did not get a full product. Moreover, if the cooking container is included within the product package, the package will requires a larger amount of shelf space in a grocery or retail store.

As a result, in most current microwave oven pasta products the pasta is cooked in a bowl supplied by the consumer which supplies enough space above the surface of the water to prevent boil-over. However, this creates added preparation time and inconvenience for the consumer. In addition, the consumer may choose a bowl too small and boil-over may still occur.

Accordingly, there is a need for improved methods for cooking dried pasta that significantly reduce boil-over in limited volume containers which allow for preparation of pasta in microwave ovens starting with dried pasta.

SUMMARY OF THE INVENTION

The present invention provides a method for preparing pasta in a microwave oven, said method comprising forming a mixture comprising an effective amount of an anti-boil-over composition, dried pasta, and water in a container (e.g., a limited volume container); and heating the mixture in the container in the microwave oven until the pasta achieves the desired degree of tenderness; wherein the anti-boil-over composition comprises at least one surfactant, an instant starch, and salt and wherein the anti-boil-over composition significantly reduces boil-over in the container during heating relative to a similar pasta and water mixture, but without the anti-boil-over composition, heated in a similar manner.

The present invention also provides a pasta meal kit suitable for microwave oven heating, said kit comprising dried pasta and an effective amount of anti-boil-over composition, wherein the anti-boil-over composition comprises about 10 to about 30 percent surfactant, about 50 to about 70 percent instant starch, and at least about 15 percent salt. Preferably, the salt is present at about 15 to about 30 percent. Preferably, the pasta meal kit also includes a limited volume container suitable for use in a microwave oven and a pasta sauce.

The present invention also provides an anti-boil-over composition suitable for use in cooking dried pasta in a microwave oven, said composition comprising about 10 to about 30 percent surfactant, about 50 to about 70 percent instant starch, and at least about 15 percent salt (preferably about 15 to about 30 percent salt); wherein the anti-boil-over composition is effective for significantly reducing boil-over when cooking dried pasta.

The present invention also provides a pasta dinner kit comprising dried pasta and a dry sauce prebend, wherein the dried pasta and the sauce preblend are packaged in a single package and wherein the dry sauce preblend is in a non-powdered form, whereby the dried pasta and the dry sauce preblend can be cooked together to form a pasta dinner in which the pasta is uniformly cooked. Preferably, the dry sauce preblend forms a cheese sauce when the dried pasta and the dry sauce preblend are cooked together. Preferably, the dry sauce preblend also contain an effective amount of the anti-boil-over composition in a non-powdered form. By including the dry sauce preblend, with or without the non-powdered anti-boil-over composition, in a non-powdered form, a uniformly cooked pasta (i.e., without undercooked portions) can be prepared even if the dried pasta and dry sauce preblend in the single package are stored together during long periods of time. Including the dry sauce preblend (and the anti-boil-over composition if present) in a non-powdered form appears to prevent the absorption or inclusion of powder within, or on the surface of, the pasta during storage, thereby allowing for more uniform cooking, even in cases where the pasta is not stirred before or during cooking.

The present invention also provides a method for producing a uniformly cooked pasta dish, said method comprising forming a dry sauce preblend in a non-powdered form, packaging dried pasta and the non-powdered form of the dry sauce preblend in a single package, whereby the dried pasta and the dry sauce preblend can be cooked together to form the cooked pasta dish in which the pasta is uniformly cooked.

Although the methods and compositions of this invention are ideally suited for microwave cooking of dried pasta, they can, of course, be used with conventional cooking techniques.

DETAILED DESCRIPTION OF THE INVENTION

The present invention provides a method for preparing a cooked pasta, said method comprising: forming a mixture comprising an effective amount of an anti-boil-over composition, dried pasta, and water in a limited volume container; and heating the mixture in the limited volume container until the pasta achieves the desired degree of tenderness and forms the cooked pasta; wherein the anti-boil-over composition comprises at least one surfactant, an instant starch, and salt, and wherein the anti-boil-over composition significantly reduces boil-over in the limited volume container during heating relative to a similar pasta and water mixture, but without the anti-boil-over composition, heated in a similar manner. The heating of the mixture can be carried out using microwave heating techniques or conventional heating techniques (e.g., stove top cooking and the like).

The anti-boil-over composition of this invention comprises about 10 to about 30 percent surfactant, about 50 to about 70 percent instant starch, and at least about 15 percent salt. Preferably the anti-boil-over compositions comprises about 10 to about 20 percent surfactant, about 50 to about 60 percent instant starch, and about 20 to about 30 percent salt. More preferably, the anti-boil-over composition comprises about 12 to about 17 percent surfactant, about 55 to about 60 percent instant starch, and about 23 to about 28 percent salt.

Suitable surfactants for use in the anti-boil-over composition include monoglycerides, diglycerides, derivatives thereof (e.g., acetylated monoglycerides, succinylated monoglycerides, citrated monoglycerides, and the like) as well as mixtures thereof. Acetylated monoglycerides are generally preferred.

Suitable instant starches for use in the anti-boil-over composition include instant and/or pregelatinized starches such as corn or tapioca starches and the like as well as mixtures thereof. Preferred instant starches include pregelatinzed corn starch, instant tapioca starch, and mixtures thereof. Although not wishing to be limited by theory, it is believed that the instant starch increases the viscosity of the aqueous medium at ambient temperatures and helps to maintain that viscosity increase at boiling temperatures.

Suitable salts for use in the anti-boil-over composition include sodium chloride, potassium chloride, magnesium chloride, and the like as well as mixtures thereof. Sodium chloride is the preferred salt. Again not wishing to be limited by theory, it is possible that the salt provides a salting out effect, modifies the surface potential of the pasta, modifies the viscosity of the aqueous medium, and/or increases the boiling point of the aqueous medium.

The various ingredients are to be added to the pasta before cooking. For example, the anti-boil-over composition could be packaged in a separate container(s) and then added to the water/pasta mixture at the beginning of the cooking process. It would be more convenient for the anti-boil-over composition to be packaged with the dried pasta; this would, of course, also prevent situations wherein the consumer forgets to add the anti-boil-over composition. However, as discussed in more detail below, it has been found that cooking pasta in water containing the anti-boil-over composition can, under some conditions (especially when the pasta and the anti-boil-over composition are in direct contact during shipping and storage in the package), result in non-uniform cooking of the pasta, as evidenced by the presence of hard or undercooked pasta. To avoid this problem, the surfactants can be, and preferably are, plated or deposited onto the instant starch using conventional techniques (e.g., powder coating, fluidized bed coating) to effectively obtain agglomerated particles. The resulting composite is then combined with the salt to form the anti-boil-over composition. Alternatively, the salt could be combined with the other ingredients prior to the plating step. In still another alternative, the salt could be added by the consumer to the pasta/water/surfactant/instant starch composition just prior to cooking. Again not wishing to be limited by theory, it is thought that the plating or depositing step increases the surface area as well as particle size of the material to allow quicker solubility in water and/or to limit entry of the surfactant/instant starch particles into cracks or fissure in the dried pasta during the packaging, transportation, and storage periods.

An effective amount of the anti-boil-over composition is added to the pasta in a limited volume container. The effective amount anti-boil-over to pasta is about 2 to about 5 g of anti-boil-over composition to about 30 to about 50 g of pasta, preferably about 3 to about 4 g of anti-boil-over composition to about 35 to about 45 g of pasta. Generally, the ratio of anti-boil-over composition to pasta is about 1:10 to about 1:15. The effective amount of anti-boil-over, pasta, and water is about 2 to about 5 g of anti-boil-over composition, about 30 to about 50 g of pasta, and about 125 to about 175 g water, preferably about 3 to about 4 g of anti-boil-over composition, about 35 to about 45 g of pasta, and about 145 to about 155 g water. Thus, the ratio of anti-boil-over composition to pasta to water is about 1:10:35 to about 1:15:55. For purposes of this invention, a limited volume container generally has about 1 to about 2 inches of head space (as determined under ambient or non-boiling conditions) above the pasta/water level. Without the anti-boil-over composition of this invention, boil-over may be significant when cooking dried pasta. Of course, the anti-boil-over composition of this invention may be used to cook dried pasta in other containers if desired.

The anti-boil-over composition of this invention is effective in reducing boil-over. However, it has been found that cooking pasta in water containing the anti-boil-over composition can, under some conditions (especially when the pasta and the anti-boil-over composition are in direct contact during shipping and storage in the package), result in non-uniform cooking of the pasta, as evidenced by the presence of hard or undercooked pasta. While not being wished to be limited by theory, it is thought that the improper hydration is a result of the anti-boil-over composition powder being trapped in the pasta (especially in pasta such as elbow spaghetti and elbow macaroni and the like). To address this issue, methods were developed to enable uniform hydration of pasta in which the exposure of the dried pasta to the anti-boil-over composition is limited. In such cases, non-powdered forms of the anti-boil-over composition (and/or sauce preblend) can be used. Examples of such non-powdered forms include tablets, agglomerates, and the like which remain intact or essentially intact during the initial portion of the cooking. During cooking, the non-powdered form breaks up, thereby releasing the anti-boil-over composition into the water. Thus, boil-over is significantly reduced or eliminated and uniform hydration of pasta during cooking is achieved. Alternatively, the anti-boil-over composition (powdered or non-powdered forms) could be packaged separately from the dried pasta and only added just before cooking or just after cooking begins. Generally, however, the non-powdered forms of the anti-boil-over composition are preferred.

It has also been found that packaging a dry sauce preblend in a non-powdered form (with or without the anti-boil-over composition) allows the pasta and the dry sauce preblend to be packaged together and still allows for uniform cooking of the pasta even in cases where the pasta is not stirred prior to, and/or during, cooking.

Thus, the present invention also provides a pasta dinner kit comprising dried pasta and a dry sauce prebend, wherein the dried pasta and the sauce preblend are packaged in a single package and wherein the dry sauce preblend is in a non-powdered form, whereby the dried pasta and the dry sauce preblend can be cooked together to form a pasta dinner in which the pasta is uniformly cooked. Preferably, the dry sauce preblend forms a cheese sauce when the dried pasta and the dry sauce preblend are cooked together. Preferably, the dry sauce preblend also contain an effective amount to the anti-boil-over composition in a non-powdered form. By including the dry sauce preblend, with or without the non-powdered anti-boil-over composition, in a non-powdered form, a uniformly cooked pasta (i.e., without undercooked portions) can be prepared even if the dried pasta and dry sauce preblend in the single package are stored together during long periods of time. Including the dry sauce preblend (and the anti-boil-over composition if present) in a non-powdered form appears to prevent the absorption or inclusion of powder within, or on the surface of, the pasta during storage, thereby allowing for more uniform cooking, even in cases where the pasta is not stirred before or during cooking.

The present invention also provides a method for producing a uniformly cooked pasta dish, said method comprising forming a dry sauce preblend in a non-powdered form, packaging dried pasta and the non-powdered form of the dry sauce preblend in a single package, whereby the dried pasta and the dry sauce preblend can be cooked together to form the cooked pasta dish in which the pasta is uniformly cooked.

The following examples are illustrative, and not limiting thereof in either scope or spirit. Those skilled in the art will readily understand that variations of the components, methods, steps, and devices described in these examples can be used. Unless noted otherwise, all percentages are by weight.

COMPARATIVE EXAMPLE 1

In a 390 ml bowl, 40 g of a thin wall dry elbow spaghetti was cooked in 150 ml of water with varying amounts of added surfactants; the head space (distance from the top of non-boiling water to top of the bowl was about 1.5 inches). The specific surfactants used were Patcote 376K (a monoglyceride from American Ingredients Co.), Acetem 95-5 (an acetylated monoglyceride from Danisco), and Myvacet 9-45K (an acetylated monoglyceride from Quest). In separate experiments, each of these surfactants were applied to the bowl walls before adding the pasta and water. The results are reported in the following table; each surfactant gave similar results. Adding surfactants did not significantly reduce boil-over; in fact, in these cases, a majority of the water would boil out of the bowl before the pasta was fully cooked.

| Addition of Surfactants to Bowl Walls | | |
|---|---|---|
| Trial No. | Surfactant (g) | Reduction of Boil-Over? |
| 1 | 0.1 | No |
| 2 | 0.5 | No |
| 3 | 1.0 | No |

Similar results were obtained when the surfactants were applied on a vented lid of a cooking container.

COMPARATIVE EXAMPLE 2

In a 390 ml bowl, 40 g of a thin wall dry elbow spaghetti was cooked in 150 ml of water with acetylated monoglycerides plated onto an instant starch. The monoglyceride/instant starch materials (CFF1118) were obtained from Danisco (New Century, Kans.) and contained an acetic acid ester of monoglycerides plated on instant tapioca starch at a ratio of 1:5 with an average particle size of about 260 microns (see Table below for relative amounts). The acetylated monoglyceride/instant starch material was added directly to the pasta before cooking. Adding this material only partially reduces boil-over. Further, this method requires high concentrations (>3 percent of water) which yields a very thick cheese sauce when dry cheese powder from a macaroni and cheese kit is added to the cooked pasta.

| Trial No. | Acetylated Monoglycerides (g) | Instant Starch (g) | Reduction of Boil-Over? |
|---|---|---|---|
| 1 | 0.2 | 0.8 | Partial |
| 2 | 0.4 | 1.6 | Partial |
| 3 | 1.0 | 4.0 | Partial |

EXAMPLE 3

In a 390 ml bowl, 40 g of thin wall dry elbow spaghetti was cooked in 150 ml of water using an anti-boil-over composition containing varying amounts of salt (NaCl and/or KCl) and acetylated monoglyceride plated onto an instant starch. Trial 1 used the same monoglyceride/instant starch materials (CFF1118) as used in Comparative Example 2. The surfactants used included Acetem 95-5 (Danisco) for Trials 2-7 and Myvacet 9-45K (Quest) for Trial 8; the starch was a pregelatinized corn starch (Staley). Plating was carried out by mixing the liquid surfactants with the starches. As shown in the table below, this composition effectively reduces boil-over. However, it was noted that, if the dried pasta and anti-boil-over composition were stored together for a significant amount of time (generally greater than about 14 days) the cooked pasta was not uniformly hydrated, with some portions under cooked.

| Trial No. | Acetylated Monoglyceride (g) | Instant Starch (g) | Salt (g) | Reduction of Boil-Over? |
|---|---|---|---|---|
| 1 | 0.4 | 1.4 | 0.7 | Significant |
| 2 | 0.4 | 1.6 | 0.7 | Significant |
| 3 | 0.4 | 2.2 | 0.6 | Significant |
| 4 | 0.5 | 1.9 | 0.8 | Significant |
| 5 | 0.6 | 2.3 | 1.0 | Significant |
| 6 | 0.9 | 3.6 | 1.6 | Significant |
| 7 | 0.2 | 2.3 | 0.8 | Significant |
| 8 | 0.2 | 2.3 | 0.8 | Significant |

Generally, the Myvacet 9-45K (Quest) from Trial 8 produced the best results.

EXAMPLE 4

This example illustrates the use of a tablet form of the anti-boil-over composition to provide more uniform hydration during cooking. A powder containing 29 percent CFF1118 (the same material as used in Comparative Example 2 having a ratio of acetylated monoglyceride to instant starch of 1:5), 13 percent oat fiber (J. Rettenmaier & Sohne, Rosenbery, Germany), 7 percent salt, 3 percent potassium chloride, 47 percent whey (American Milk Products, Cresskill, N.J.), 0.03 percent color, and 0.77 percent oil (medium-chain triglyceride Neobee M5 oil, Stepan Inc., Maywood, N.J.). Tablets (about 2 g with 1 inch diameter) were prepared using a Carver Press (Fred S. Carver, Inc.; Menomonee Fall, Wis.) at 1000 psi of pressure. Three tablets (about 6 g) were cut into quarters and placed in a microwaveable bowl (about 390 ml size) with 40 g of thin wall elbow spaghetti and 150 g of water. The pasta was microwaved on high in an 1100 Watt Panasonic Microwave for 3.5 minutes. Cheese powder from a macaroni and cheese dinner kit was added with stirring. The amount of boil-over during cooking was significantly reduced. The pasta was uniformly cooked with no observable under cooked portions even when the pasta was not stirred before or during cooking.

The same anti-boil-over composition in powdered form was used to prepare a similar pasta dinner using the same techniques. Although the amount of boil-over during cooking was significantly reduced, the pasta was not uniformly cooked and some under cooked portions remained.

EXAMPLE 5

This example illustrates the use of an agglomerated form of the anti-boil-over composition to provide more uniform hydration during cooking. A powder composition was prepared by blending a modified food starch plated with acetylated monoglyceride (29 percent; CFF1118 from Comparative Example 2), whey powder (47 percent; Agropur-Granby, Quebec City, Canada), oat fiber (13 percent; Vitacel HF0210 from Rettenmaier & Sohne, Rosenberg, Germany), sodium chloride (7 percent), potassium chloride (3 percent), color (0.2 percent; Sensient, St. Louis, Mo.), and oil (0.8 percent; medium-chain triglyceride Neobee M5 oil from Stepan, Inc., Maywood, N.J.). The powder composition (about 400 g) was agglomerated in a fluidized bed agglomerator equipped for top spray applications (Uni-Glatt, Glatt Air Techniques, Inc.); additional whey powder (about 25 g) was mixed with water (about 175 g) for use as the binding solution for agglomeration. The agglomerator operating conditions were as follows: inlet air temperature of 50° C., outlet pressure of 20 mbar, and spray rate of about 16 g/min using a dual fluid nozzle. The resulting agglomerates had particle sizes in the range of about 140 to about 1000 microns (greater than twice the size of the starting powder). This agglomerated powder was mixed with thin wall elbow spaghetti and then treated with vibration to mimic the conditions during distribution. The pasta (about 40 g) and agglomerated powder (about 6 g) were mixed with water (about 150 g) in a 390 ml microwavable bowl and cooked in a microwave oven on high for 3.5 minutes. Cheese powder from a macaroni and cheese dinner kit was added with stirring. The amount of boil-over was significantly reduced during cooking. The cooked product was uniform and substantially free of undercooked portions.

EXAMPLE 6

This example illustrates the use of an agglomerated form of the anti-boil-over composition to provide more uniform hydration during cooking.

Component 1: A modified food starch (about 400 g; Tate & Lyle, Decatur, Ill.) was agglomerated individually in the same fluidized bed agglomerator. The agglomeration conditions were the same as described in Example 5 except that about 150 g water was used as the agglomeration medium. The resulting particles had particle sizes in the range of about 140 to about 1000 microns (greater than twice the size of the original powder).

Component 2: Whey powder (about 400 g) was similarly agglomerated individually in the same fluidized bed agglomerator and under the same conditions except that about 120 g water was used. The resulting particles had particle sizes in the range of about 140 to about 1000 microns (greater than twice the size of the original powder).

A powder composition was prepared by blending Component 1 (26.7 percent), Component 2 (54.0 percent), the modified food starch containing acetylated monoglyceride of Example 5 (6.7 percent), sodium chloride (7.5 percent), potassium chloride (4.2 percent), color (0.04 percent), and the oil of Example 5 (0.9 percent)). The blend was then mixed with a thin wall elbow spaghetti (about 40 g) and water (about 150 g) in a 390 ml microwaveable bowl and cooked in a microwave oven on high for 3.5 minutes. Cheese powder (about 14.5 g) from a macaroni and cheese dinner kit was then mixed with the cooked pasta to provide the final product. The amount of boil-over was significantly reduced during cooking. The cooked product was uniform and substantially free of undercooked portions regardless of whether the pasta and powder composition were stirred prior to cooking.

EXAMPLE 7

This experiment illustrates the use of the agglomerated form of the anti-boil-over composition to provide more uniform hydration during cooking in comparison to commercially available pasta dinner kits containing various cheese powders. In a 390 ml bowl, 40 g of thin-wall pasta was cooked in 150 ml of water using 6 g of the agglomerated anti-boil-over composition as described in Example 6 or 6 g of a variety of commercially available cheese powder samples from (1) Dominick's Quick Mac MW Dinner—(Dominick's—Oak Brook, Ill.); (2) Quest—Hoffman Estates, Ill.; (3) Firmenich—Plainsboro, N.J.; and (4) Sargento—Plymouth, Wis. The mixtures were heated on high in an 1100 Watt Panasonic Microwave for 3.5 minutes.

As shown in the table below, the inventive agglomerated anti-boil composition was the only product that provided a fully cooked pasta with reduced boil-over.

| Sample | Undercooked Pasta | Hydration | Boil-over |
| --- | --- | --- | --- |
| Inventive | No | Fully Hydrated | No |
| Dominick's Quick Mac MW Dinner | Yes | Mostly Hydrated | Yes |
| Quest Cheddar Cheesex | Yes | Mostly Hydrated | Yes |
| Quest Cheese Rind Flavor | Yes | Did Not Fully Hydrate | Yes |
| Quest Cheddar Cheese | Yes | Did Not Fully Hydrate | Yes |

-continued

| Sample | Undercooked Pasta | Hydration | Boil-over |
|---|---|---|---|
| Firmenich Natural Cheddar Zest | Yes | Mostly Hydrated | Yes |
| Firmenich Natural Cheddar | Yes | Mostly Hydrated | Yes |
| Firmenich Natural Flavor Cheddar Cheese Type | Yes | Mostly Hydrated | Yes |
| Firmenich Natural Cheddar Cheese | Yes | Did Not Fully Hydrate | Yes |
| Sargento White Cheddar Cheese | Yes | Did Not Fully Hydrate | Yes |
| Sargento Cheddar | Yes | Did Not Fully Hydrate | Yes |

What is claimed is:

1. A method for preparing pasta, said method comprising forming a mixture comprising an effective amount of an anti-boil-over composition, dried pasta, and water in a container; and heating the mixture in the container until the pasta is sufficiently cooked to achieve the desired degree of tenderness; wherein the anti-boil-over composition comprises 6.06 to about 30 weight percent monoglyceride surfactant, about 50 to about 70 weight percent instant starch, and at least about 15 weight percent salt, the monoglyceride surfactant, starch and salt in amounts effective to reduce boil over during heating in a limited volume container, and wherein the anti-boil-over composition can reduce boil-over during heating in a limited volume container relative to a similar pasta and water mixture, but without the anti-boil-over composition, heated in a similar manner using the limited volume container and wherein the monoglyceride comprises an acetylated monoglyceride.

2. The method of claim 1, wherein the heating is carried out in a microwave oven.

3. The method of claim 2, wherein the anti-boil-over composition is in a non-powdered form.

4. The method of claim 2, wherein a sauce is added to the mixture prior to heating.

5. The method of claim 2, wherein a sauce is added to the cooked pasta.

6. The method of claim 4, wherein the pasta is macaroni and the sauce is a cheese sauce.

7. The method of claim 5, wherein the pasta is macaroni and the sauce is a cheese sauce.

8. The method of claim 2, wherein the instant starch comprises pregelatinized corn starch or pregelatinized tapioca starch.

9. The method of claim 2, wherein the salt is sodium chloride, potassium chloride, magnesium chloride, or mixtures thereof.

10. The method of claim 4, wherein the salt is sodium chloride, potassium chloride, magnesium chloride, or mixtures thereof.

11. A pasta meal kit suitable for microwave oven heating, said kit comprising dried pasta and an effective amount of anti-boil-over composition, wherein the anti-boil-over composition is a blend of active ingredients which consists essentially of 6.06 to about 30 weight percent monoglyceride surfactant, about 50 to about 70 weight percent instant starch, and at least about 15 weight percent salt, and wherein the effective amount of the anti-boil-over composition is capable of reducing boil-over when the dried pasta is cooked in water in a limited volume container with microwave oven heating relative to cooking the dried pasta in a similar manner in the limited volume container without the anti-boil-over composition and wherein the monoglyceride surfactant comprises an acetylated monoglyceride.

12. The pasta meal kit of claim 11, wherein the anti-boil-over composition is in a non-powdered form.

13. The pasta meal kit of claim 11, further comprising a limited volume container suitable for use in a microwave oven and a pasta sauce.

14. The pasta meal kit of claim 13, wherein the pasta is macaroni and the sauce is a cheese sauce.

15. The pasta meal kit of claim 11, wherein the instant starch is pregelatinized corn starch or pregelatinized tapioca starch.

16. The pasta meal kit of claim 11, wherein the salt is sodium chloride, potassium chloride, magnesium chloride, or mixtures thereof.

17. The pasta meal kit of claim 11, wherein the instant starch is pregelatinized corn starch or pregelatinized tapioca starch and the salt is sodium chloride, potassium chloride, magnesium chloride, or mixtures thereof.

18. A pasta dinner kit comprising dried pasta, a non-powdered anti-boil-over composition, and a dry sauce preblend, wherein the dried pasta, anti-boil-over composition, and the sauce preblend are packaged in a single package, wherein the anti-boil-over composition comprises at least one surfactant, an instant starch, and salt, said anti-boil-over composition comprising a blend of active ingredients comprising 6.06 to about 30 weight percent monoglyceride surfactant comprising an acetylated monoglyceride, about 50 to about 70 weight percent instant starch, and at least about 15 weight percent salt, the monoglyceride surfactant, starch and salt in amounts effective to reduce boil over during heating in a limited volume container; wherein the anti-boil-over composition is in an amount which is effective for reducing boil-over when the dried pasta is cooked in water in a limited volume container with microwave oven heating relative to cooking the dried pasta in a similar manner in the limited volume container without the anti-boil-over composition and wherein the dry sauce preblend is in a non-powdered form, whereby the dried pasta, anti-boil-over composition and the dry sauce preblend can be cooked together to form a pasta dinner in which the pasta is uniformly cooked.

19. The pasta dinner kit of claim 18, the instant starch is pregelatinized corn starch or pregelatinized tapioca starch; and wherein the salt is sodium chloride, potassium chloride, magnesium chloride, or mixtures thereof.

20. A method for producing a uniformly cooked pasta dish, said method comprising forming a dry sauce preblend, forming an anti-boil-over composition, wherein the anti-boil-over composition comprises a blend of active ingredients comprising at least one monoglyceride surfactant, an instant starch, and salt, said composition comprising 6.06 to about 30 weight percent surfactant comprising an acetylated monoglyceride, about 50 to about 70 weight percent instant starch, and at least about 15 weight percent salt, the monoglyceride surfactant, starch and salt in amounts effective to reduce boil over during heating in a limited volume container; wherein the anti-boilover composition is in an amount which is capable of reducing boil-over when the dried pasta is cooked in water in a limited volume container with microwave oven heating relative to cooking the dried pasta in a similar manner in the limited volume container without the anti-boil-over composition, and packaging dried pasta, the non-powdered anti-boil-over composition, and the dry sauce preblend in a single package, whereby the dried pasta, the non-powdered anti-boil-over composition, and the dry sauce preblend can be cooked together to form the cooked pasta dish in which the pasta is uniformly cooked.

21. A method for producing a pasta meal kit suitable for heating in a microwave oven, said method comprising:
   forming a dry sauce preblend;
   blending active ingredients to provide an anti-boil-over blend consisting essentially of at least one monoglyceride surfactant, an instant starch, and salt, the monoglyceride surfactant comprising 6.06 to about 30 weight percent of the blend, the instant starch comprising about 50 to about 70 weight percent of the blend, the salt comprising at least about 15 percent of the blend, the monoglyceride surfactant, starch and salt in amounts effective to reduce boil over during heating in a limited volume container, the monoglyceride surfactant comprising an acetylated monoglyceride; and
   packaging the blend of active ingredients, the dry sauce preblend and pasta, wherein the anti-boil-over blend is in an amount which is capable of reducing boil-over when the pasta is cooked in water in a limited volume container with microwave oven heating relative to cooking the pasta in a similar manner in the limited volume container without the anti-boil-over blend.

22. The method of claim 21, wherein the pasta is macaroni and the dry sauce preblend includes cheese.

23. The method of claim 22, wherein the instant starch comprises pregelatinized corn starch or pregelatinized tapioca starch.

24. The method of claim 23, wherein the salt is sodium chloride, potassium chloride, magnesium chloride, or mixtures thereof.

* * * * *